INVENTORS: E. M. GYORGY
E. A. NESBITT
BY George S. Indig
ATTORNEY

MAGNETIC INDUCTION (B) IN GAUSS VS. FIELD STRENGTH (H) IN OERSTEDS FOR 78% Ni - 20% Fe - 2% Au

INVENTORS: E. M. GYORGY
E. A. NESBITT
BY George S. Indig
ATTORNEY

PERMALLOY WITH GOLD ADDITIONS

Filed Sept. 16, 1960 6 Sheets-Sheet 3

INVENTORS: E.M. GYORGY
E.A. NESBITT
BY
George S. Indig
ATTORNEY

Dec. 4, 1962 E. M. GYORGY ETAL 3,067,029

PERMALLOY WITH GOLD ADDITIONS

Filed Sept. 16, 1960 6 Sheets-Sheet 4

INVENTORS: E. M. GYORGY
E. A. NESBITT
BY
George S. Indig
ATTORNEY

INVENTORS: E. M. GYORGY
E. A. NESBITT

BY George S. Indig
ATTORNEY

INVENTORS: E. M. GYORGY
E. A. NESBITT
BY George S. Indig
ATTORNEY

United States Patent Office 3,067,029
Patented Dec. 4, 1962

3,067,029
PERMALLOY WITH GOLD ADDITIONS

Ernst M. Gyorgy, Morris Plains, and Ethan A. Nesbitt, Berkeley Heights, N.J., assignors to Bell Telephone Laboratories, Incorporated, New York, N.Y., a corporation of New York Filed Sept. 16, 1960, Ser. No. 56,436
8 Claims. (Cl. 75—170)

This invention relates to magnetic memory devices and, more particularly, to such devices in which information is stored in the form of representative magnetic states, to methods for fabricating materials used in such devices and to the materials so produced.

Magnetic memory devices, particularly those exploiting magnetic materials displaying a substantially rectangular hysteresis characteristic, such as Permalloy, are well known and have advantageously found wide application for both the temporary and permanent storage of information.

Recent developments have indicated that memory storage devices, such as the twistor described in copending application Serial Number 675,522, filed August 1, 1957, may be constructed using soft magnetic materials, such as Permalloy, in various configurations. The basic mode of operation of such memory structures involves changing the direction of magnetization of portions of a soft magnetic wire or tape by applying external magnetic forces. Thus, for example, a preferred or "easy" magnetic flux path is established in a soft magnetic tape by one of various known methods. An information bit may then be stored in the tape by subjecting it to an external magnetic force oriented in a direction parallel to the preferred magnetic flux path of the tape and of a magnitude at least equal to the coercive force of the tape.

As a result of exposure to such external magnetic force, the exposed portion becomes magnetized. This magnetized portion is representative of a particular information bit, and this information bit is stored until the magnetic state of the tape is altered. In the conventional magnetic memory type of structure, removal from storage of this information bit, or read out, may be effected by subjecting the magnetic material to an external magnetic force which has an orientation direction opposite to the direction of magnetization of the tape. In a coincudent current twistor the readout means may suitably have up to double the coercive force of the tape.

The memory structures which based on the above described principles usually consist of arrays of magnetic storage elements arranged in a geometrical pattern. As mentioned above, the coercive force of the magnetic material plays an important role in the operation of magnetic memory structures, a value in the range of from 4 to 5 oersteds having been found to produce satisfactory operation of one type of such structure. Another equally important characteristic is the squareness ($B_r/B_s$) of the hysteresis loop of the magnetic material. The squareness of the hysteresis loop is determinative of the signal to noise ratio in a coincident current memory, the two parameters being directly proportional. Since high signal to noise is desirable, magnetic materials having high values of squareness, for example, of the order of 0.9 or greater, are preferred for this use. Magnetic material employed in the fabrication of such alloys is preferably possessed of substantially uniform magnetic characteristics to assure uniformity of response throughout the entire system.

Conventional magnetic materials have not been found to be completely satisfactory in manifesting the requisite combination of coercive force and squareness required by the above-mentioned memory structure application. The known magnetic materials fall into two classes: those termed soft magnetic materials such as Permalloy, Supermalloy, Permendur, and Supermendur, which have coercive forces in the fully annealed state of the order of 0.02 oersted, and hard or permanent magnetic materials of coercive force of the order of 50 oersteds or more. In general, the squareness of both the soft and the hard magnetic materials in the fully annealed states lies below 0.9. It is possible to increase both the squareness and coercive force by cold working. However, there are terminal values of coercive force and squareness, beyond which cold working produces no further increase. For many purposes, the terminal properties, in particular, are unsuitable.

In accordance with the present invention, both the coercive force and the squareness of soft magnetic materials are tailored to fit the requirements of the desired end use by employing any of a series of alloys obtained by adding gold to Permalloy. In contrast to prior art materials the coercive force of soft magnetic materials prepared according to the present inventive techniques may be increased to values meeting the design requirements of typical devices. Thus, for example, a soft magnetic material, such as 78.5 Permalloy (78.5% nickel, 21.5% iron) which normally possesses a coercive force of the order of 0.06 oersted may be modified by the addition of gold in accordance with this invention to yield tape or wire having a coercive force in the range of 6.0 oersteds. An important advantage of the Permalloy-gold materials of the present invention is the reduction of switching time when these materials are employed in an electronically alterable twistor memory. The squareness ratio of the material herein ranges upward of 0.9.

The invention is more readily understood when described in conjunction with the following drawings in which.

Figure 1:
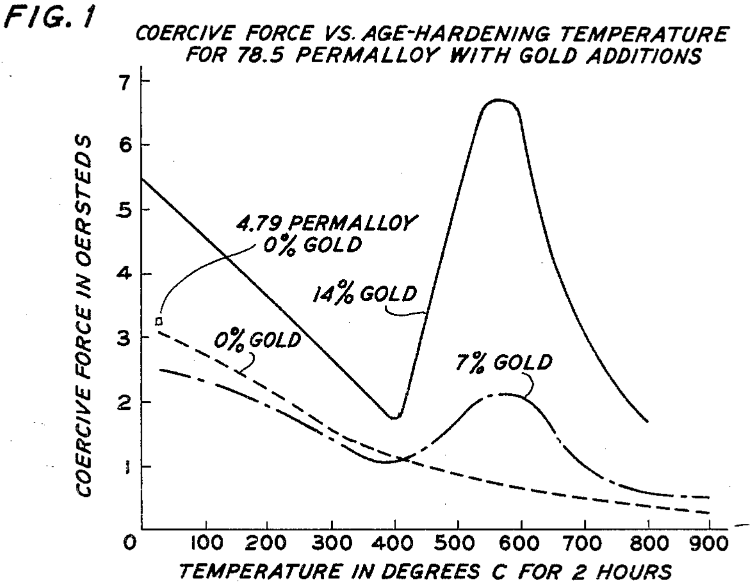
FIG. 1 is a graph on coordinates of coercive force in oersteds against temperature in degrees centigrade showing the variation of coercive force with variations in age-hardening temperatures for a 75 nickel–7 gold–18 iron–0.6 manganese composition, a 78.5 Permalloy and a 71 Ni Permalloy with 14% gold (15 Fe).

With respect more particularly to FIG. 1, the graph shows coercive force in oersteds as a function of annealing temperatures for a 78.5 Permalloy and also for such a material additionally containing 7 percent and 14 percent respectively gold based on the entire composition.

The materials were fabricated into switching cores by annealing at 900° C. and cold rolling from 0.014 inch to 0.000125 inch followed by annealing in a magnetic field for two hours in various temperatures up to 900° C. with final cooling to room temperature at 40° C. per minute.

As is shown in the figure, the coercive force of the 78.5 Permalloy is highest in the "as rolled" condition (3.5 oersteds) and it slowly decreases with annealing to a low of 0.25 oersted at 900° C.

With regard to the 78.5 Permalloy containing 7 percent gold it is seen that the coercive force is highest in the "as rolled" condition (2.5 oersteds) and it decreases slowly with annealing to a minimum point at 400° C. where the cold working strains are relieved. At higher temperatures, however, coercive force begins to rise and reaches a maximum peak of 2.1 oersteds at 600° C. and finally falls to 0.5 oersted at 800° C. The peak of 2.1 oersted may be attributed to the precipitation of a gold-rich phase in a nickel-rich matrix.

The 78.5 Permalloy containing 14 percent gold follows a pattern similar to that of the 7 percent gold composition, evidencing a minimum point at 400° C. and a maximum at approximately 600° C.

The curves discussed clearly evidence the improved coercive force which results from addition of gold to a 78.5 Permalloy.

Figure 2:
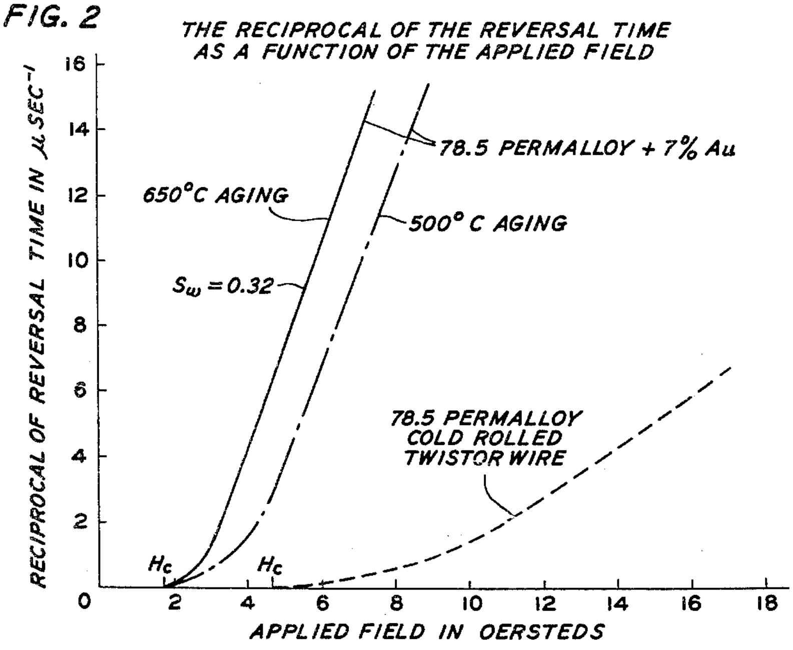
FIG. 2 is a graph on coordinates of reciprocal of reversal in $\mu$sec.$^{-1}$ against applied field in oersteds showing the switching speed of three samples of material; a 78.5 Permalloy containing 7% gold annealed at 500° C., a second sample of the same composition annealed at 650° C. and a sample of 78.5 Permalloy containing no gold but work hardened by cold rolling.

FIG. 2 is a graph showing reciprocal of reversal time in microseconds as a function of applied field in oersteds for (*a*) a 78.5 Permalloy additionally containing 7 percent gold annealed at 500° C.

(*b*) a 78.5 Permalloy additionally containing 7 percent gold annealed at 650° C.

(*c*) a cold rolled 78.5 Permalloy (no gold addition). The term switching speed as used herein is intended to mean the reversal time for an applied field of twice the coercive force. It is noted from the graph that the sample annealed at 650° C. had a switching speed of 3½ times that of the sample annealed at 500° C. although both samples had the same value of coercive force ($H_c$). This difference in the switching time is attributed to the more complete relief of the working strains of the sample annealed at 650° C. The cold rolled sample evidenced rather slow switching speeds up to about 10 oersteds after which there was a gradual increase.

The switching speed of the 650° C. sample is approximately three to four times faster than the cold worked sample containing no gold.

Figure 3:
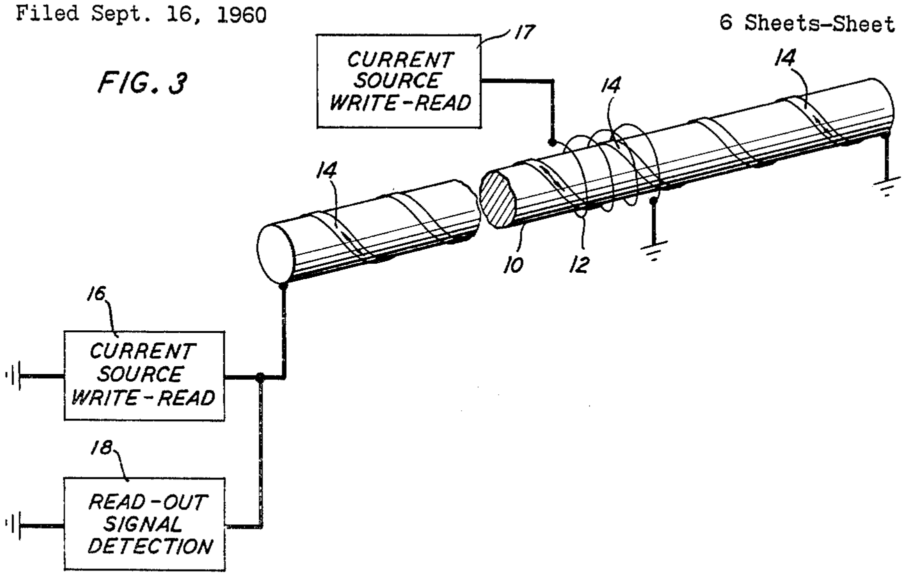
FIG. 3 is a perspective view of a magnetic memory element employing a soft magnetic tape produced in accordance with the present invention.

FIG. 3 depicts a magnetic memory element of the type described in copending application Serial Number 675,522 filed August 1, 1957 by A. H. Bobeck. One such memory element utilizing a soft magnetic material herein is discussed below. The element shown in FIG. 3 consists of a non-magnetic conductor 10 around which is wound gold-Permalloy tape 14. The easy direction of magnetization of the flux in winding 14 is shown by the double-ended arrows. One end of conductor 10 is connected to current source 16 and the other end is connected to ground. An external insulated solenoid 12, one end of which is connected to ground, is also connected to a current source 17 and is inductively coupled to conductor 10. Detection means 18 is employed to detect the occurrence of a change in the magnetic state of tape 14.

A flux oriented in a particular direction may be induced in conductor 10 by application of electrical currents of sufficient magnitude from source 16 and 17. The flux state of conductor 10 may be regarded as a particular information bit, which is stored. This operation constitutes the write phase of the memory function.

Information stored in conductor 10 is read out by reversing the polarity of the currents previously applied from current source 16 and 17. The application of such reverse current pulses causes a change in the direction of magnetization which produces a change in the electric potential between the ends of conductor 10. This change in potential is detected by means 18 as an output pulse superimposed upon the switching current pulse applied to conductor 10. A more detailed description of the operation of the memory element is beyond the scope of the present specification. Such detailed information may be found in the aforementioned copending application filed by A. H. Bobeck.

The magnetic memory device depicted in FIG. 3 is intended to be exemplary of an important use of gold-Permalloy compositions prepared in accordance with the present inventive techniques. It is to be understood that the compositions may be used in the fabrication of magnetic memory elements based on principle of operation different than those of the structure of FIG. 3. Any magnetic device or structure which requires magnetic elements may be fabricated from gold-Permalloy composition prepared as described herein.

Figure 4:
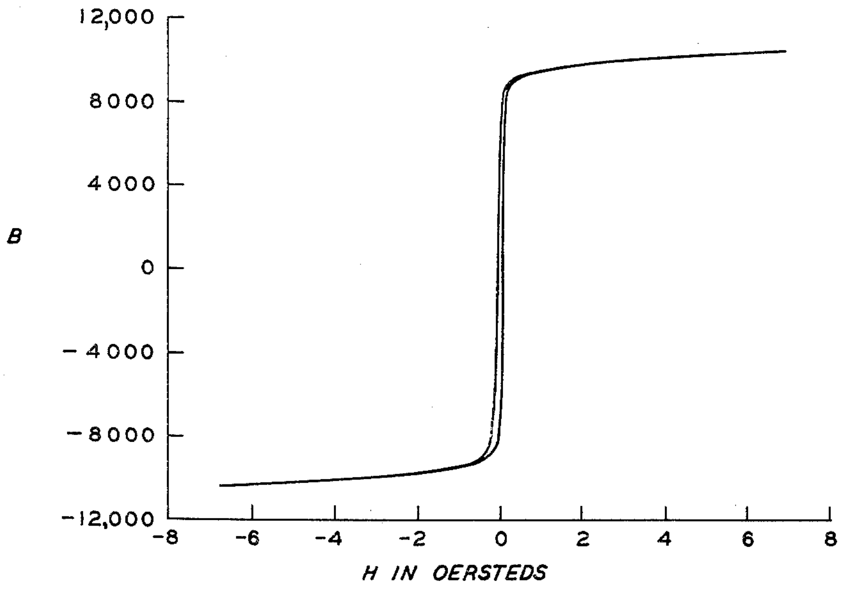
FIGS. 4 through 12 are graphs on coordinates of magnetic induction (B) in gauss against field strength (H) in oersteds showing the hysteresis loops for various Permalloy-gold compositions.
Figure 5:
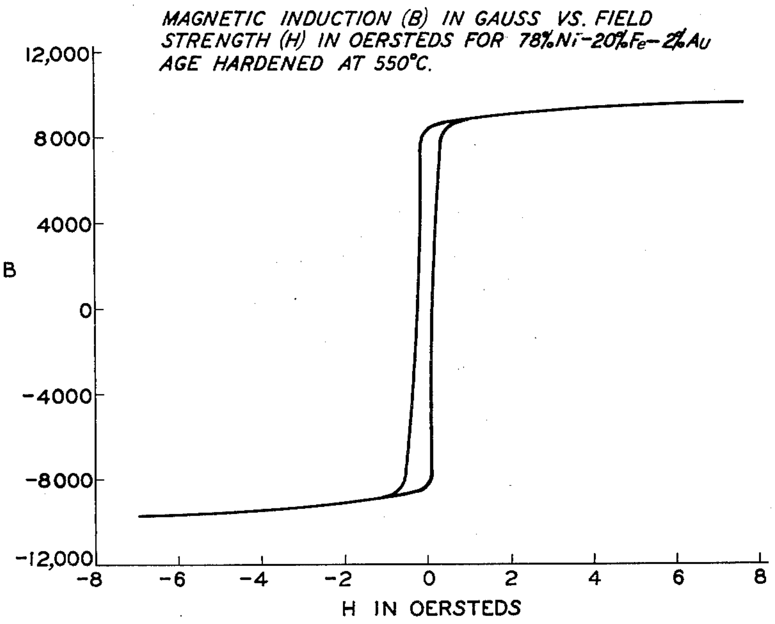
Figure 6:
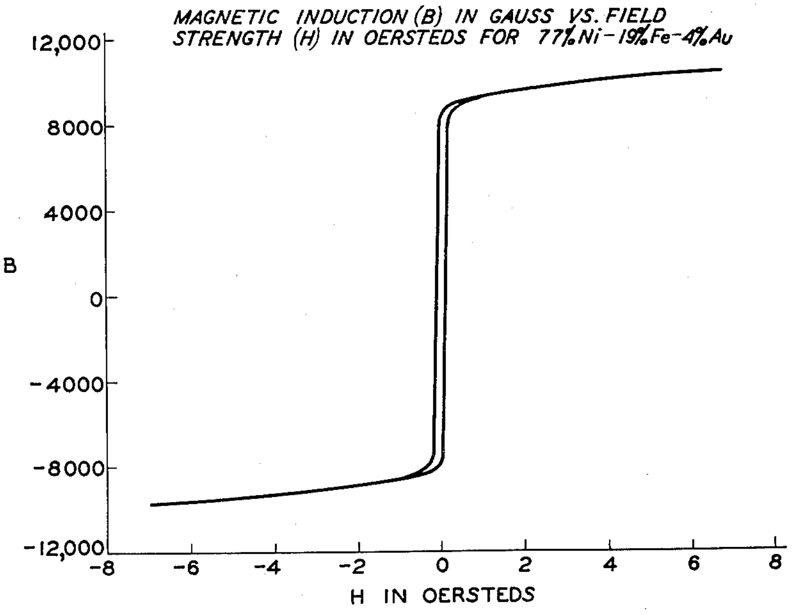
Figure 7:
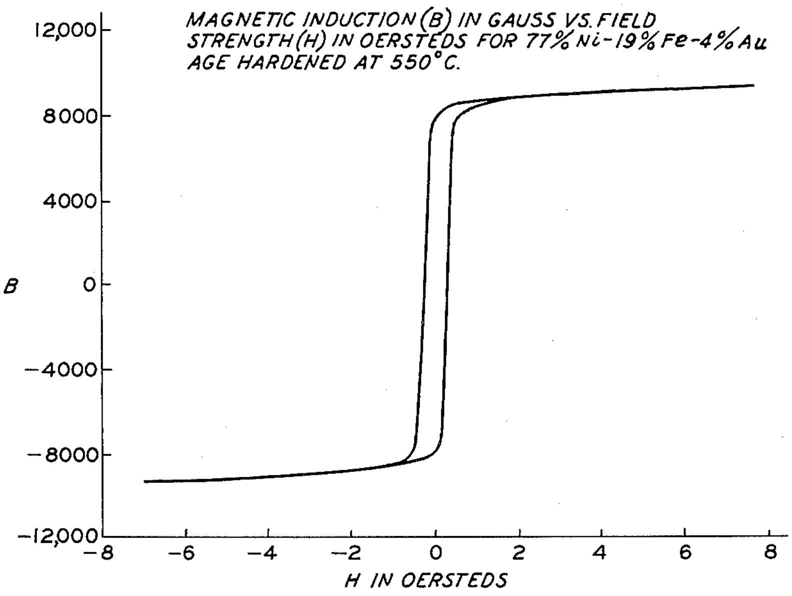
Figure 8:
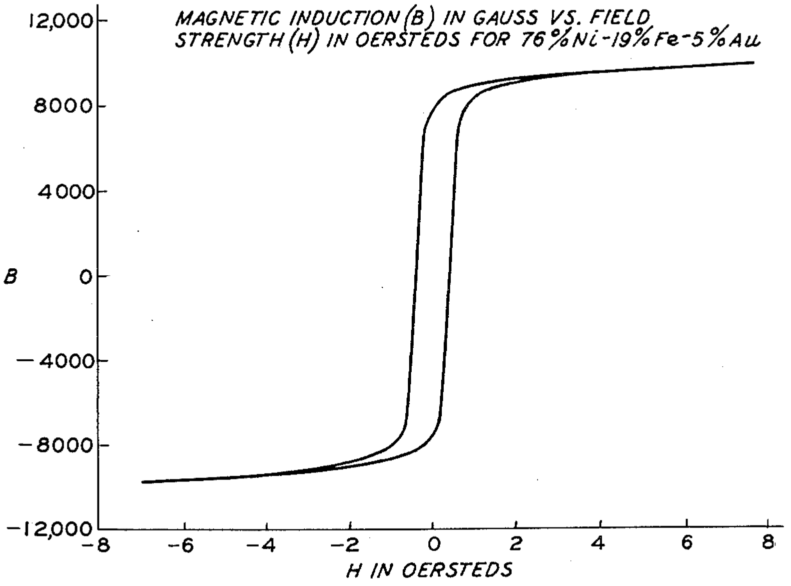
Figure 9:
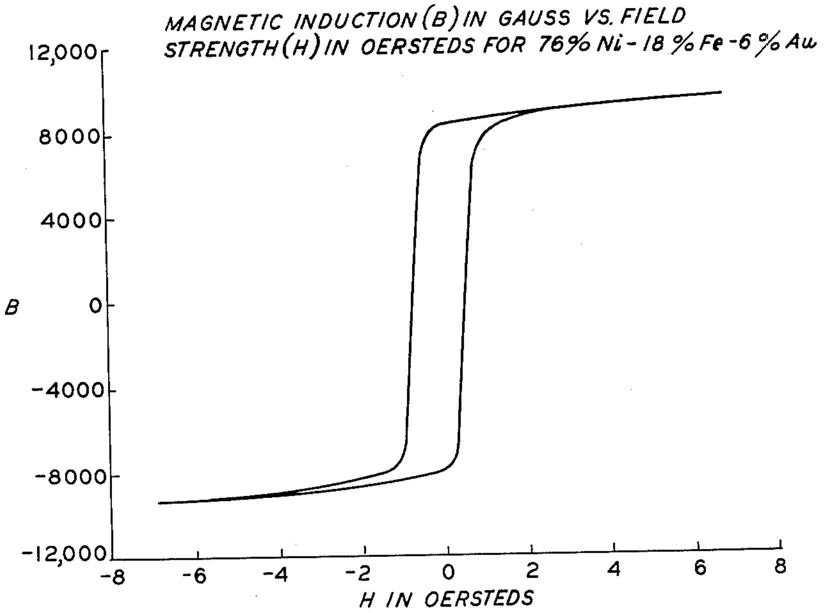
Figure 10:
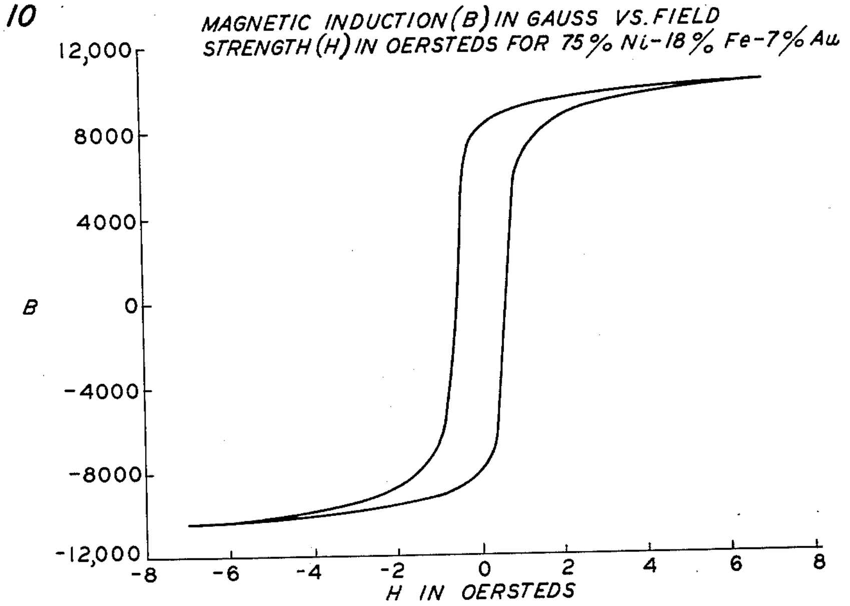

FIG. 4 shows the hysteresis loop for an alloy of 78 percent nickel, 20 percent iron, and 2 percent gold after magnetic anneal at 750° C. The loop is reasonably square and the coercive force is less than 0.1 oersted which is normal for the nickel-iron alloy without gold addition. Upon age-hardening this alloy at 550° C. for two hours in a field, the coercive force increases to approximately 0.2 oersted while the loop remains square as shown in FIG. 5. Similar behavior is shown in FIG. 6 for the alloy 77 percent nickel, 19 percent iron, 4 percent gold after an anneal plus a magnetic field heat treatment at 750° C. The loop is square and the coercive force is approximately 0.1 oersted. Upon aging this alloy at 550° C. for two hours in a field and slow cooling, its coercive force approximately doubles without impairing squareness ratio as shown in FIG. 7.

Further heat treatments as described and the increase in gold content from 2 to 4 percent only increased the coercive force slightly. As the gold content is increased to 5, 6, 7 and 8 percent increased values of coercivity are obtained as shown in FIGS. 8, 9, 10 and 11. The 7 percent gold alloy evidences a coercivity of approximately 0.6 oersted and still maintains a reasonably square hysteresis loop.

Figure 11:
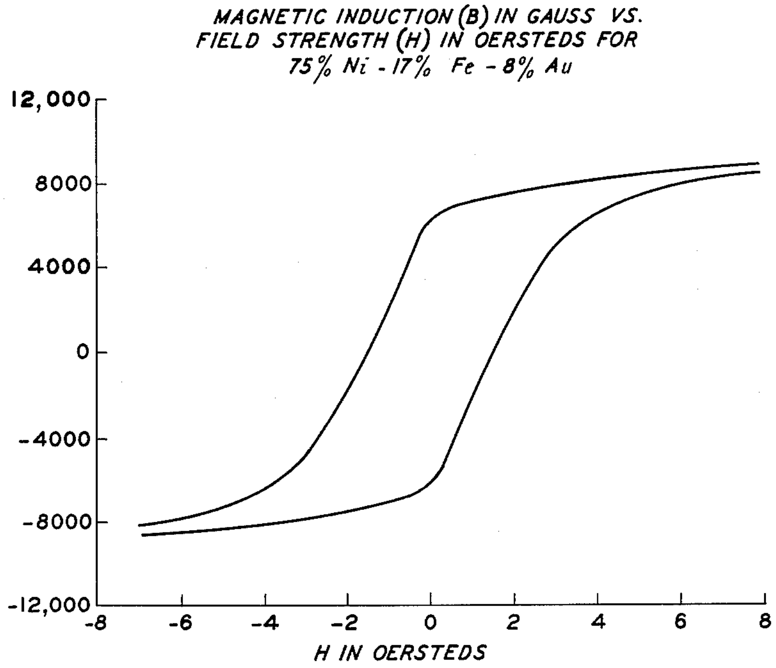
Figure 12:
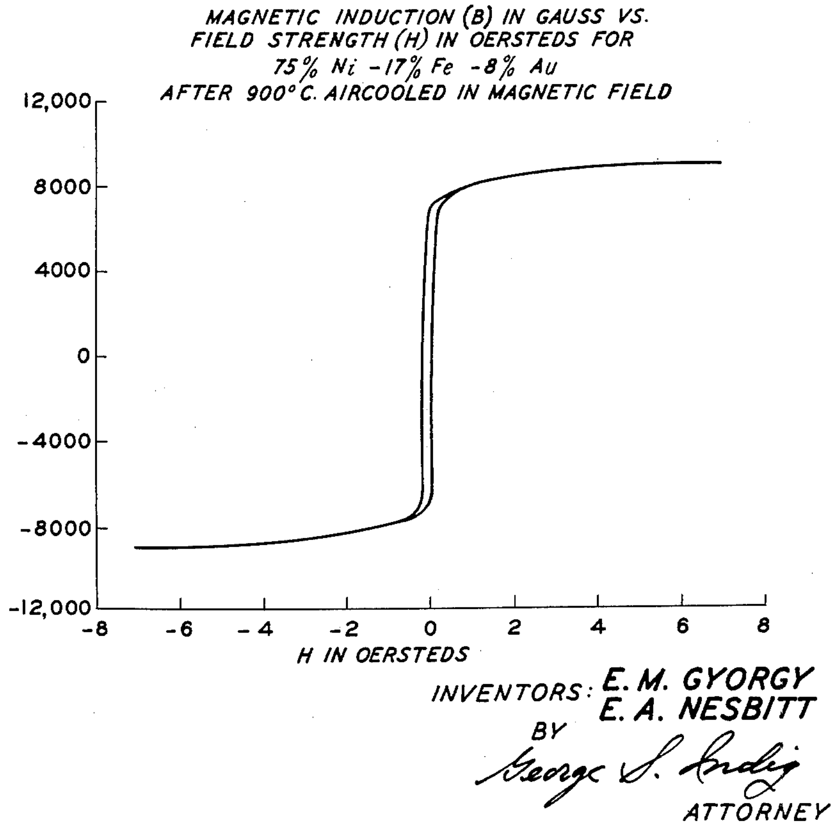

At 8 percent gold concentration the coercive force increases but the heat treatment produces a slightly skewed hysteresis loop. This material has a coercive force of 1.5 oersted as shown in FIG. 11. This behavior may be explained by the fact that the 750° C. annealing temperature is in the two-phase region for this composition and an excess amount of second phase is precipitated. The alloy was then cooled rapidly in a field from 900° C. and the characteristic square hysteresis loop was again obtained as shown in FIG. 12.

At 14 percent gold concentration the coercive force rise occurs and when heat treated at 600–650° C. a slightly skewed hysteresis loop is obtained.

The term Permalloy, as classically employed, defines nickel-iron alloys containing 35 to 85 percent nickel which have been annealed at 1000° C. and slow cooled. As used herein, the term Permalloy defines a composition whose magnetostriction and crystal anisotropy approximates zero. Permalloy compositions evidencing such properties generally have a percentage of nickel within the range of 63 to 85 percent by weight of the total composition.

A typical procedure for the preparation of gold-Permalloy compositions of the present invention comprises preparing a melt containing iron, nickel and gold in the desired proportions by introducing the virgin metals of commercial grade into a high frequency induction furnace and heating until the melting point is reached.

Next, the molten mixture is poured into a graphite mold, typically one which is ⅞ inch in diameter. After cooling the mold, the resultant gold-Permalloy bar ⅞ inch in diameter is hot swaged to about ⅝ inch at a temperature in the range of 900 to 1000° C.

Following the swaging, the bar is cut to remove surface oxides, so reducing its diameter from 10/16 to 9/16 inch. Then the material is cold rolled to a strip .014 inch thick, annealed at 900° for 5 minutes and cold rolled on a Rohn mill from .014 inch to .000125 inch. This cold rolling is an important part of the treatment of the alloy and the degree of cold rolling may be varied within the range of 75–99% to suit individual applications. The metal strip so produced is now ready for fabrication into a small switching core. The strip is approximately 1 inch in width and is cut to 0.25 inch in width. Then it is insulated with magnesium oxide so as to electrically and thermally protect the composition. Following this, the strip is wound on a small ceramic bobbin ¼ inch in diameter.

Next, the switching core may be annealed for about 2 hours in a magnetic field at a temperature in the range of 400 to 800° C. in order to produce a material possessing characteristics desired in the instant case.

The effect of the magnetic field during the annealing is in general beneficial but in many instances it may be dispensed with in order to simplify the heat treatment. Annealing at temperatures below or above the indicated limits results in sacrifices in coercive force and switching speeds. It is preferred to employ temperatures of the order of 500 to 650° C.

Variations in the time of annealing also cause alterations in the characteristics of the material. However, the Permalloy-gold compositions discussed are far more sensitive to temperature changes and times of from a few minutes to six hours are considered practical.

As noted above, compositions containing 35 to 85 percent nickel by weight of the total composition, wherein the ratio of nickel to iron is at least within the approximate range of from 2:1 to 6:1, are of interest in the present application. The percentage of gold added to the nickel-iron mix is controlled by the nature of the characteristics desired, that is, coercive force and squareness ratio evidenced by the resultant material. For the purposes described herein, ½ to 20 percent of gold by weight of the total composition may be employed. Percentages less than ½ do not significantly increase coercive force whereas percentages greater than 20 create practical problems, such as increasing the difficulty of cold rolling. It is preferred to employ 6 to 14 percent of gold in the Permalloy composition discussed.

It may be desirable to add percentages of the order of 5 percent molybdenum to the composition prepared in order to increase resistivity. Furthermore, percentages of the order of 1 percent manganese or other additions for purposes known to those skilled in the art may be made.

The following examples are given by way of illustration and not limitation unless otherwise noted in the appended claims.

*Example 1*

10 melts were prepared containing 75 parts nickel, 7 parts gold, 18 parts iron and about 0.6 part manganese by adding the virgin metals of commercial grade to a high frequency induction furnace and heating until the mixture is molten. The mixtures were then poured into a graphite mold ⅞ inch in diameter and cooled to produce gold-Permalloy bars. Following this, the bars were hot swaged to ⅝ inch at a temperature of 1000° C. and cut to remove surface oxides. Next the bars were cold rolled to metal strips .014 inch thick and annealed at 900° C. The annealed bars were then cold rolled to strips on a Rohn mill from .014 inch thickness to .000125 inch. Switching cores were next prepared by splitting the strips to a width of .025 inch, insulating with magnesium oxide and winding on a ceramic bobbin ¼ inch in diameter. The ten strips were then annealed at temperatures varying from 400 to 800° C., as shown in Table 1 below, for two hours in a magnetic field. The coercive force in oersteds for the various treatments is shown in Table 1.

TABLE 1

| Temperature (degrees centigrade): | Coercive force (oersteds) |
|---|---|
| 400 | 1.05 |
| 450 | 1.40 |
| 500 | 1.70 |
| 550 | 2.10 |
| 575 | 2.15 |
| 600 | 2.10 |
| 650 | 1.70 |
| 675 | 1.30 |
| 700 | 1.05 |
| 800 | 0.05 |

*Example 2*

The procedure of Example 1 was repeated with a composition containing 71 percent nickel, 14 percent gold, 15 percent iron and 0.6 percent manganese. Four samples were prepared and annealed at 400, 500, 600 and 700° C., respectively. Table 2 below indicates the values of coercive force for these compositions.

TABLE 2

| Temperature (degrees centigrade): | Coercive force (oersteds) |
|---|---|
| 400 | 1.75 |
| 500 | 5.20 |
| 600 | 6.60 |
| 700 | 3.15 |

While the invention has been described in detail in the foregoing specification and the drawings similarly illustrate the same, the aforesaid is by way of illustration only and is not restrictive in character. The several modifications which will readily suggest themselves to persons skilled in the art are all considered within the scope of this invention, reference being had to the appended claims.

What is claimed is:

1. A composition of matter comprising ½ to 20 percent by weight gold, 63 to 85 percent by weight nickel, remainder iron wherein the ratio of nickel to iron is within the approximate range of from 2:1 to 6:1.

2. A composition of matter consisting essentially of 78 percent by weight nickel, 20 percent by weight iron and 2 percent gold.

3. A composition of matter consisting essentially by weight of 75 parts nickel, 7 parts gold, 18 parts iron and 0.6 part manganese.

4. A composition of matter consisting essentially by weight of 71 parts nickel, 14 parts gold, 15 parts iron and 0.6 part manganese.

5. A magnetic memory element comprising a magnetic conductor consisting essentially of ½ to 20 percent by weight gold, 63 to 85 percent by weight nickel, remainder iron wherein the ratio of nickel to iron is within the approximate range of from 2:1 to 6:1, said conductor having a substantially rectangular hysteresis loop.

6. A magnetic memory element comprising a magnetic conductor consisting essentially by weight of 75 parts nickel, 7 parts gold, 18 parts iron and 0.6 part manganese, said conductor having a substantially rectangular hysteresis loop .

7. A magnetic memory element comprising a magnetic conductor consisting essentially by weight of 14 parts gold, 15 parts iron, 71 parts nickel and 0.6 part manganese.

8. A magnetic memory element comprising a magnetic conductor consisting essentially of 78 percent by weight nickel, 20 percent by weight iron, and 2 percent by weight gold.

References Cited in the file of this patent

UNITED STATES PATENTS

| | | |
|---|---|---|
| 1,743,089 | Bandur | Jan. 14, 1930 |
| 1,838,130 | Beckinsale | Dec. 29, 1931 |

FOREIGN PATENTS

| | | |
|---|---|---|
| 684,186 | Germany | Nov. 23, 1939 |

OTHER REFERENCES

Heterogeneous Precipitation in the Au-Ni System, Walter Gerlach, Zietschrift fur Metallkunde, vol. 40, August 1949, pp. 281–289.

UNITED STATES PATENT OFFICE
CERTIFICATE OF CORRECTION

Patent No. 3,067,029 December 4, 1962

Ernst M. Gyorgy et al.

It is hereby certified that error appears in the above numbered patent requiring correction and that the said Letters Patent should read as corrected below.

Column 5, line 36, for "35" read -- 63 --.

Signed and sealed this 27th day of August 1963.

(SEAL)
Attest:

ERNEST W. SWIDER
Attesting Officer

DAVID L. LADD
Commissioner of Patents